(12) United States Patent
Li et al.

(10) Patent No.: US 8,862,372 B2
(45) Date of Patent: Oct. 14, 2014

(54) INTERSECTION-STOPPING-RATE SPECIFYING APPARATUS, NAVIGATION APPARATUS, COMPUTER PROGRAM FOR SPECIFYING INTERSECTION-STOPPING-RATE, COMPUTER PROGRAM FOR CONDUCTING NAVIGATION

(75) Inventors: Cheng Li, Nagoya (JP); Masahisa Nogawa, Nagoya (JP); Masahiro Miyoshi, Kariya (JP); Kiyotaka Taguchi, Kariya (JP); Masayuki Narita, Kariya (JP); Makoto Yano, Kariya (JP); Hiroki Ukai, Kariya (JP)

(73) Assignees: Toyota Mapmaster Incorporated, Nagoya-shi, Aichi (JP); Denso Corporation, Kariya-shi, Aichi (JP)

( * ) Notice: Subject to any disclaimer, the term of this patent is extended or adjusted under 35 U.S.C. 154(b) by 256 days.

(21) Appl. No.: 13/582,355

(22) PCT Filed: Nov. 30, 2010

(86) PCT No.: PCT/JP2010/071306
§ 371 (c)(1),
(2), (4) Date: Aug. 31, 2012

(87) PCT Pub. No.: WO2011/114582
PCT Pub. Date: Sep. 22, 2011

(65) Prior Publication Data
US 2013/0006508 A1    Jan. 3, 2013

(30) Foreign Application Priority Data

Mar. 17, 2010   (JP) ................................. 2010-060095

(51) Int. Cl.
*G06F 19/00*   (2011.01)
*G01C 21/26*   (2006.01)
*G08G 1/01*   (2006.01)
*G08G 1/081*   (2006.01)

(52) U.S. Cl.
CPC .............. *G08G 1/0112* (2013.01); *G01C 21/26* (2013.01); *G08G 1/081* (2013.01); *G08G 1/0129* (2013.01); *G08G 1/0145* (2013.01)
USPC ........... 701/117; 701/408; 701/533; 701/450; 340/907; 340/909; 340/917; 340/933; 340/934

(58) Field of Classification Search
CPC ......... G08G 1/01; G08G 1/0104; G08G 1/08; G08G 1/081; G08G 1/082; G08G 1/096716; G08G 1/096741; G08G 1/096775; G01C 21/26; G09B 29/102
See application file for complete search history.

(56) References Cited

U.S. PATENT DOCUMENTS 7,840,427 B2 * 11/2010 O'Sullivan ........................ 705/6
7,885,764 B2 *  2/2011 Van Buer ....................... 701/450

(Continued)

FOREIGN PATENT DOCUMENTS

JP        9-73593      3/1997
JP      2004-257852    9/2004

(Continued)

*Primary Examiner* — Redhwan k Mawari
(74) *Attorney, Agent, or Firm* — Quarles & Brady LLP; Gavin J. Milczarek-Desai

(57) ABSTRACT

Provided is an apparatus and method for automatically creating stopping rates of vehicles at signal-equipped intersections. A signal-equipped intersection to be subjected to specifying of stopping rates at signal-equipped intersections is selected from a signal-equipped-intersection information storage unit as a target intersection, a pass-through-intersection extraction that extracts a signal-equipped intersection that was passed-through just before reaching the target intersection as a pass-through intersection is conducted according to a prescribed rule, driving-history data of a probe car is classified for each of the routes that start from the pass-through intersection and pass through the target intersection, and the rate at which the probe car stopped at the target intersection is specified as a stopping rate, for each of the classified routes.

20 Claims, 13 Drawing Sheets

(56) References Cited

U.S. PATENT DOCUMENTS

| | | | |
|---|---|---|---|
| 8,279,086 B2* | 10/2012 | Liu et al. | 340/909 |
| 2003/0225668 A1* | 12/2003 | Goto et al. | 705/37 |
| 2006/0106531 A1* | 5/2006 | Nagase et al. | 701/200 |
| 2007/0198176 A1* | 8/2007 | Endo et al. | 701/208 |
| 2010/0079306 A1* | 4/2010 | Liu et al. | 340/909 |
| 2013/0006508 A1* | 1/2013 | Li et al. | 701/117 |

FOREIGN PATENT DOCUMENTS

| | | |
|---|---|---|
| JP | 2006-59058 | 3/2006 |
| JP | 2008-199381 | 8/2008 |
| JP | 2009-110042 | 5/2009 |
| JP | 2009-244167 | 10/2009 |
| JP | 2009-259158 | 11/2009 |
| JP | 2010-44525 | 2/2010 |

* cited by examiner

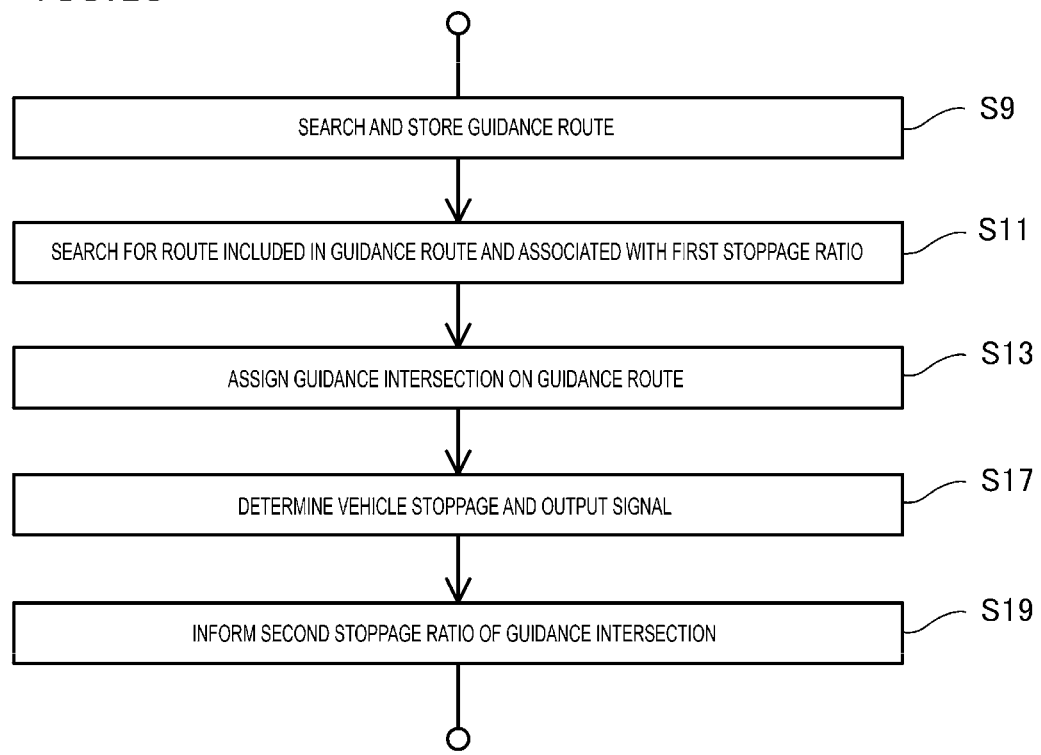

INTERSECTION-STOPPING-RATE SPECIFYING APPARATUS, NAVIGATION APPARATUS, COMPUTER PROGRAM FOR SPECIFYING INTERSECTION-STOPPING-RATE, COMPUTER PROGRAM FOR CONDUCTING NAVIGATION

FIELD OF INVENTION

The present invention relates to a device for specifying a stoppage ratio of a vehicle at an intersection and a method of the same.

BACKGROUND ART

Vehicle drivers are very curious about information whether the drivers are not likely to stop at a traffic signal intersection, which the drivers are going to pass.

Patent Document 1 proposes a device that analyzes drive data obtained from a probe car so as to determine whether data indicative of the stoppage of the vehicle corresponds to information indicative of the signal waiting at the intersection or information indicative of the parking.

In contrast, there is proposed a technique that uses a navigation device to inform fuel saving drive. Also, it is known, in general, that when the vehicle accelerates from a stoppage state or a drive state, a fuel consumption markedly increases.

In order to avoid acceleration in the drive state so as to suppress the increase in fuel consumption, Patent Document 2 proposes a technique, in which when there is no more driving force request to an engine of the driving vehicle, the technique computes a maximum reachable distance that the coasting vehicle is capable of running before the vehicle speed is reduced to a predetermined vehicle speed. Then, the technique informs the vehicle driver of information related to the reachable distance. In other words, when the vehicle is expected to stop at a stop position downstream of the driving route, the vehicle driver knows that the vehicle driver is capable of reaching the stop position without further turning on the accelerator if the vehicle driver starts cruising at a position that is away from the stop position by a distance equal to or less than the reachable distance. As a result, the above driving technique is capable of avoiding the unnecessary acceleration and thereby suppressing the excessive fuel consumption.

Please refer Patent Document 3 and Patent Document 4 that disclose conventional techniques related to the invention of the present application.

PRIOR ART REFERENCE

Patent Document

[Patent Document 1] JP-A-2006-59058
[Patent Document 2] JP-A-2009-244167
[Patent Document 3] JP-A-2008-199381
[Patent Document 4] JP-A-2009-259158

SUMMARY OF THE INVENTION

Problems to be Solved by the Invention

The present inventors have diligently studied to specify more practical stoppage ratio at the traffic signal intersection. As a result, the inventors found the following problems.

The stoppage ratio at a traffic signal intersection is often influenced by cooperative operation timing of changing signals of another traffic signal intersection that is located close to the traffic signal intersection.

Also, the stoppage ratio at the traffic signal intersection depends on a drive route. In other words, the difference in exit links, which exit from the traffic signal intersection, and the difference in approach links, which enter into the other traffic signal intersection that is located close to the traffic signal intersection, are highly likely to influence the stoppage ratio at the traffic signal intersection.

It is an objective of the present invention to consider the cooperative operation timing of changing the signals between a target traffic signal intersection, to which the stoppage ratio is specified, and another traffic signal intersection, which is located close to the traffic signal intersection, and drive route so as to more accurately specify the stoppage ratio at the traffic signal intersection. Also, it is another objective of the present invention to use the stoppage ratio so as to inform a vehicle driver of a path that enables a comfortable and smooth driving.

Means for Solving the Problems

The present invention is made in view of achieving the above objectives, and the first aspect of the present invention is defined as follows. More specifically, an intersection stoppage ratio specifying device comprising:

a drive history data storage unit that stores drive history data of a probe car;

a traffic signal intersection information storage unit that stores information related to traffic signal intersections;

a target intersection selecting unit that selects, as a target intersection, the traffic signal intersection, for which a stoppage ratio is specified, from the traffic signal intersection information storage unit;

a passing-through intersection extracting unit that extracts, as a passing-through intersection, the traffic signal intersection, which the probe car passes immediately before the probe car reaches the target intersection, based on a predetermined rule;

a route-based classifying unit that classifies the drive history data for each route that runs from the passing-through intersection to the target intersection; and a stoppage ratio specifying unit that specifies the stoppage ratio for each classified route, the stoppage ratio being a ratio of the probe car stoppage at the target intersection.

According to the intersection stoppage ratio specifying device of the first aspect defined as above, a route that runs through the target intersection, for which the stoppage ratio is specified, and the passing-through intersection, which is passed immediately before reaching the target intersection, is classified for each of the same routes so as to specify the stoppage ratio at the target intersection for each of the same routes. As above, by making the pair of the target intersection and the passing-through intersection, it is possible to specify the stoppage ratio in consideration of the cooperative operation timing of changing signals between the target intersection and its adjacent intersection (passing-through intersection). Also, when the stoppage ratio is specified for each classified route, it is possible to specify the stoppage ratio in consideration of dependency of the route (an entrance route and an exit route for the target intersection and the passing-through intersection).

In the present specification, the stoppage ratio indicates a ratio of the number of the drive history data indicating the stoppage at the target intersection to the number of the drive history data indicating the passing of the target intersection. The stoppage ratio is computed for each of the same routes that run through the passing-through intersection and the target intersection.

The second aspect of the present invention is defined as follows. More specifically, in the intersection stoppage ratio specifying device defined in the first aspect, the stoppage ratio is specified under each assigned condition.

According to the intersection stoppage ratio specifying device of the second aspect defined as above, it is possible to specify the stoppage ratio at the traffic signal intersection for each assigned condition. The assigned condition may define that the probe car stops at the passing-through intersection (third aspect). If the intersection stoppage ratio is specified based on the condition, it is possible to specify the ratio of the drive history data, in which the vehicle stops at the passing-through intersection and then drives and again stops at the target intersection. In the above case, in the navigation system, when the vehicle, which stopped at the passing-through intersection, is informed of the stoppage ratio at the target intersection, it is possible to more accurately inform the vehicle of the stoppage ratio.

Also, the assigned condition may be a time zone and/or a day of week (fourth aspect). The change timing of the traffic signals may vary depending on the time zone of a day or the day of week. Thus, if the stoppage ratio is specified for each condition, it is possible to inform the drive vehicle of the stoppage ratio in consideration of the driving time zone or the day of week.

Furthermore, the assigned condition may be a traffic signal waiting time at the target intersection (fifth aspect). For example, if the stoppage ratio is specified every predefined traffic signal waiting time, it is possible to inform the stoppage ratio at the target intersection in association with the traffic signal waiting time.

The sixth aspect of the present invention is defined as follows. More specifically, the intersection stoppage ratio specifying device defined in any one of the first to fifth aspects is provided with a cost setting unit that sets cost based on the specified stoppage ratio.

According to the intersection stoppage ratio specifying device of the sixth aspect defined as above, it is possible to set cost information for nodes and links that correspond to the target intersection (or the route near the target intersection). As a result, the path guidance by the navigation system combines the cost information and conventional cost information (for example, a distance, a required time, a road type, or the like) so as to provide a fuel saving guidance route, which enables more smooth driving. Also, the target intersection having high cost, or in other words, the target intersection, at which the vehicle is likely to stop by a high ratio, may be excluded from the guidance route. Furthermore, routes near the target intersection may be excluded from the guidance route. Also, if driving advice for deceleration is provided at a position upstream of the target intersection, it is possible to suppress the excessive fuel consumption.

Information obtained by the intersection stoppage ratio specifying device of the present invention may be used by a navigation device as road information.

More specifically, the seventh aspect of the present invention is defined as follows.

A navigation device include:
a search unit that searches for a path from an origin to a destination based on a predetermined rule; and
a first cost storage unit that stores first cost, which is set by the intersection stoppage ratio specifying device defined in the sixth aspect, wherein:
the search unit determines the path by referring the first cost.

According to the navigation device of the seventh aspect defined as above, the path is determined by referring the first cost, which is set by the intersection stoppage ratio specifying device of the present invention. As a result, in the determination of the path, it is possible to consider the cost based on the stoppage ratio at the target intersection, and thereby to provide a highly accurate low cost guidance route.

The eighth aspect of the present invention is defined as follows. More specifically, the navigation device defined in the seventh aspect, further includes:
a stoppage determining unit that determines a vehicle driving on the guidance route stops at the passing-through intersection; and
a second cost storage unit that refers the stoppage ratio at the target intersection for a case, where the vehicle stops at the passing-through intersection, so as to set second cost of the target intersection, the stoppage ratio being specified by the intersection stoppage ratio specifying device defined in the third aspect, the second cost storage unit storing the second cost, wherein:
when the stoppage determining unit determines that the vehicle stops, if the second cost is equal to or greater than a predetermined threshold value, the search unit re-searches for the path that runs from the passing-through intersection as the origin.

According to the navigation device of the eighth aspect defined as above, when it is determined that the vehicle driving on the guidance route stops at the passing-through intersection, the second cost is referred so that the path is re-searched for from the passing-through intersection as the origin. As a result, it is possible to consider the stoppage state at the traffic signal intersection during the driving on the guidance route, and thereby to provide, as required, a route realizing smooth driving.

The ninth aspect of the present invention is defined as follows. More specifically,
a navigation device includes:
a guidance route storage unit that stores a guidance route, which is searched for by a navigation system;
a first stoppage ratio storage unit that stores first stoppage ratios in association with routes, the first stoppage ratios being specified by the intersection stoppage ratio specifying device defined in any one of the first to sixth aspects;
a route search unit that refers the guidance route storage unit to search for the route, which is included in the guidance route and associated with the first stoppage ratio, from the first stoppage ratio storage unit;
a guidance intersection assigning unit that assigns, as a guidance intersection, the target intersection, for which the first stoppage ratio is specified, in the searched route; and
a first guidance unit that informs information related to the first stoppage ratio associated with the assigned guidance intersection.

The navigation device of the ninth aspect defined as above uses the stoppage ratio at the target intersection, which is obtained by the drive history data during the actual vehicle drive. As a result, it is possible to inform the practical stoppage ratio. Also, when the vehicle driver is, in advance, informed of information related to the stoppage ratio at the target intersection, mental stress of the driver is reduced while waiting the signal at the target intersection.

The tenth aspect of the present invention is defined as follows. More specifically, the navigation device defined in the ninth aspect, further includes:

a stoppage determining unit that determines a vehicle driving on the guidance route stops at the passing-through intersection;

a second stoppage ratio storage unit that stores a second stoppage ratio in association with a route, the second stoppage ratio being specified by the intersection stoppage ratio specifying device according to aspect 3; and a second guidance unit that informs information related to the second stoppage ratio associated with the assigned guidance intersection when the stoppage determining unit determines that the vehicle stops.

The navigation device of the tenth aspect defined as above informs the vehicle driver of information related to the second stoppage ratio when it is determined that the vehicle driving on the guidance route stops at the passing-through intersection. The second stoppage ratio is a stoppage ratio at the target intersection for a case, where the vehicle stops at the passing-through intersection. In the informing of the stoppage ratio at the target intersection, it is possible to inform the highly accurate stoppage ratio if using the stoppage ratio at the target intersection, which ratio is specified based on the drive history data indicating that the vehicle stops at the passing-through intersection.

Also, the eleventh aspect of the present invention is defined as follows. More specifically, a computer program for specifying an intersection stoppage ratio causes a computer to function as:

target intersection selecting means for selecting, as a target intersection, a traffic signal intersection, for which a stoppage ratio is specified, from a traffic signal intersection information storage unit that stores information related to traffic signal intersections;

passing-through intersection extracting means for extracting, as a passing-through intersection, the traffic signal intersection, which is passed immediately before reaching the target intersection, based on a predetermined rule;

route-based classifying means for classifying drive history data of a probe car for each route including a route that runs from the passing-through intersection to the target intersection; and stoppage ratio specifying means for specifying, as the stoppage ratio, a ratio, by which the probe car stops at the target intersection, for each route.

According to the invention defined in the eleventh aspect defined as above, it is possible to achieve the effects equivalent to those of the first aspect.

The twelfth aspect of the present invention is defined as follows. More specifically, in the computer program defined in the eleventh aspect, the stoppage ratio is specified under each assigned condition.

According to the invention defined in the twelfth aspect defined as above, it is possible to achieve the effects equivalent to those of the second aspect.

The thirteenth aspect of the present invention is defined as follows. More specifically, in the computer program defined in the twelfth aspect, the assigned condition is that the probe car stops at the passing-through intersection.

According to the invention defined in the thirteenth aspect defined as above, it is possible to achieve the effects equivalent to those of the third aspect.

The fourteenth aspect of the present invention is defined as follows. More specifically, in the computer program defined in the twelfth or thirteenth aspects, the assigned condition is a time zone and/or a day of week.

According to the invention defined in the fourteenth aspect defined as above, it is possible to achieve the effects equivalent to those of the fourth aspect.

The fifteenth aspect of the present invention is defined as follows. More specifically, in the computer program defined in any one of the twelfth to fourteenth aspects, the assigned condition is a traffic signal waiting time at the target intersection.

According to the invention defined in the fifteenth defined as above, it is possible to achieve the effects equivalent to those of the fifth aspect.

The sixteenth aspect of the present invention is defined as follows. More specifically, the computer program defined in any one of the eleventh to fifteenth aspects further causes the computer to function as cost setting means for setting cost based on the specified stoppage ratio.

According to the invention defined in the sixteenth aspect defined as above, it is possible to achieve the effects equivalent to those of the sixth aspect.

The seventeenth aspect of the present invention is defined as follows. More specifically, a computer program for navigation causes a computer to function as:

searching means for searching for a path from an origin to a destination based on a predetermined rule, wherein the searching means determines the path by referring first cost, which is set by the computer program defined in the sixteenth aspect.

According to the invention defined in the seventeenth aspect defined as above, it is possible to achieve the effects equivalent to those of the seventh aspect.

The eighteenth aspect of the present invention is defined as follows. More specifically, the computer program defined in the seventeenth aspect further causes the computer to function as:

stoppage determining means for determining that a vehicle driving on the guidance route stops at the passing-through intersection, wherein:

when the stoppage determining means determines that the vehicle stops, if the second cost, which is set by referring the stoppage ratio at the target intersection for a case, where the vehicle stops at the passing-through intersection, is equal to or greater than a predetermined threshold value, the searching means re-searches for the path that runs from the passing-through intersection as the origin, the stoppage ratio being specified by the computer program defined in the thirteenth aspect.

According to the invention defined in the eighteenth aspect defined as above, it is possible to achieve the effects equivalent to those of the eighth aspect.

The nineteenth aspect of the present invention is defined as follows. More specifically, a computer program for navigation causes a computer to function as:

route searching means for referring a guidance route storage unit that stores a guidance route, which is searched for by a navigation system, so as to search for a route, which is included in the guidance route and associated with a first stoppage ratio, from a first stoppage ratio storage unit, the first stoppage ratio being specified by the computer program defined in any one of the eleventh to sixteenth aspects, the first stoppage ratio storage unit storing the first stoppage ratios in association with routes;

guidance intersection assigning means for assigning, as a guidance intersection, a target intersection, for which the first stoppage ratio is specified, in the searched route; and first guidance means for informing information related to the first stoppage ratio associated with the assigned guidance intersection.

According to the invention defined in the nineteenth aspect defined as above, it is possible to achieve the effects equivalent to those of the ninth aspect.

The twentieth aspect of the present invention is defined as follows. More specifically, the computer program defined in the nineteenth aspect further causes the computer to function as:

stoppage determining means for determining that a vehicle driving on the guidance route stops at the passing-through intersection; and second guidance means for informing information related to a second stoppage ratio when the stoppage determining means determines that the vehicle stops, the second stoppage ratio being associated with the assigned guidance intersection and specified by the computer program defined in the thirteenth aspect.

According to the invention defined in twentieth aspect defined as above, it is possible to achieve the effects equivalent to those of the tenth aspect.

BRIEF DESCRIPTION OF THE DRAWINGS

FIG. 13 is a flow chart illustrating operation of the navigation device of other example of the present invention.

EMBODIMENT CARRYING OUT THE INVENTION

An intersection stoppage ratio specifying device according to embodiments of the present invention will be described.

Figure 1:
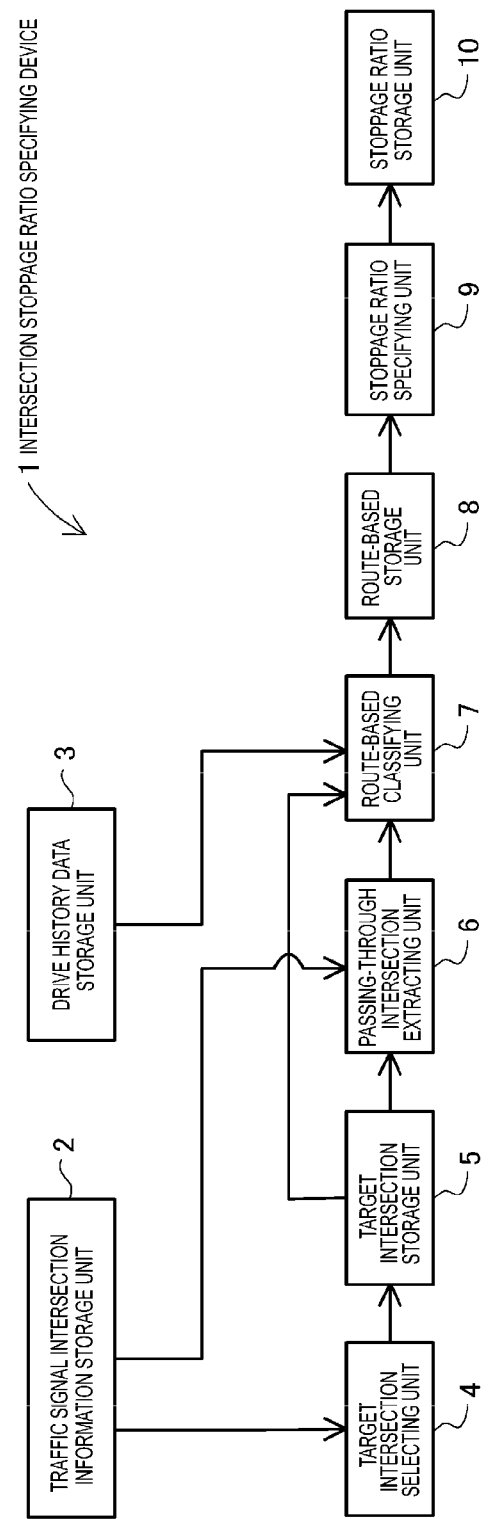
FIG. 1 is a block diagram illustrating a configuration of an intersection stoppage ratio specifying device according to an embodiment of the present invention.

FIG. 1 shows a schematic configuration of an intersection stoppage ratio specifying device 1 according to an embodiment of the present invention.

As shown in FIG. 1, the intersection stoppage ratio specifying device 1 includes a traffic signal intersection information storage unit 2, a drive history data storage unit 3, a target intersection selecting unit 4, a target intersection storage unit 5, a passing-through intersection extracting unit 6, a route-based classifying unit 7, a route-based storage unit 8, a stoppage ratio specifying unit 9, and a stoppage ratio storage unit 10.

The traffic signal intersection information storage unit 2 stores traffic signal intersection information. The traffic signal intersection information is information for specifying intersections, at which traffic signals are installed, on a map. For example, the traffic signal intersection information may employ combination of nodes as map information and existence information of traffic signals as road information.

The drive history data storage unit 3 stores drive history data recorded while the vehicle actually drives. Examples of the drive history data include, for example, probe information. The probe information includes at least coordinate information and ID information for identifying a probe car. Vehicles with position detecting function, such as GPS, are capable of specifying the above information. Furthermore, the vehicles are preferably provided with time information, speed information, direction information, height information, accelerator position, engine rotational speed, fore-and-aft acceleration, yaw rate, stop lamp, ABS warning lamp, fuel consumption, electric power remaining capacity, steering angles (rotation angle information of a handle), gear shift lever information, and the like.

The target intersection selecting unit 4 refers the traffic signal intersection information storage unit 2, and selects, as a target intersection, a traffic signal intersection, for which a stoppage ratio is specified. The selected intersection may be any intersection that is provided with a traffic signal. Alternatively, for example, the selected intersection may be a traffic signal intersection on a main road. This is because the navigation system mostly selects the main road as a guidance route. The selected target intersection information is, then, stored in the target intersection storage unit 5.

The passing-through intersection extracting unit 6 refers the traffic signal intersection information storage unit 2, and extracts a certain traffic signal intersection as a passing-through intersection based on a predetermined rule. The vehicle passes the certain traffic signal intersection immediately before the vehicle reaches the target intersection. In the example predetermined rule, when the certain traffic signal intersection, which the vehicle passes immediately before the vehicle reaches the target intersection, is located within a certain distance from the target intersection, it is possible to extract the certain traffic signal intersection as the passing-through intersection. Also, in another rule, examples of the passing-through intersection may include a traffic signal intersection, which the vehicle passes immediately before the vehicle reaches the target intersection, and which is connected with the target intersection along a road without turning at any node located between the target intersection and the traffic signal intersection that the vehicle passes immediately before the vehicle reaches the target intersection. Furthermore, the passing-through intersection may exclude a specific traffic signal type, such as a push-button-controlled traffic signal. Other examples of the specific traffic signal type include a flashing warning traffic signal, a vehicle actuated traffic signal, and the like.

The single passing-through intersection may be extracted. Alternatively, a set of two or more passing-through intersections may be extracted. For example, The passing-through intersection may include both a first traffic signal intersection and a second traffic signal intersection. The first traffic signal intersection is passed by the vehicle immediately before the vehicle reaches the target intersection. The second traffic signal intersection is passed by the vehicle immediately before the vehicle reaches the first traffic signal intersection.

When the passing-through intersection is extracted based on the above predetermined rule, it is possible to more accurately specify a stoppage ratio at the target intersection.

The route-based classifying unit 7 classifies, among drive history data stored in the drive history data storage unit 3, drive history data, which includes drive history indicating a route running through the extracted passing-through intersection and the target intersection stored in the target intersection storage unit 5, for each route. In the above, the drive history data classified for each route is preferably classified to have the same drive route running from the passing-through intersection and the target intersection, and at least have the same link (referred to as an approach link) directly connected to the passing-through intersection and the same link (referred to as an exit link) directly connected to the target intersection. For example, when the passing-through intersection and the target intersection are both four-way intersection, the route-based classifying unit 7 classifies the route into nine categories in consideration of the three approach links connected to the passing-through intersection and the three exit links connected to the target intersection. If the stoppage ratio at the target intersection, which will be described later, is specified based on the drive history data classified for each route, it is possible to specify the stoppage ratio in consideration of the cooperative operation timing of changing the signals at the passing-through intersection and the target intersection, and the difference in the approach/exit links.

The route-based classifying unit 7 may alternatively classify the drive history data for each route by excluding the drive history data indicating substantially slow drive speed and the drive history data indicating substantially high drive speed that exceeds limiting speed set for the target route.

Figure 2:
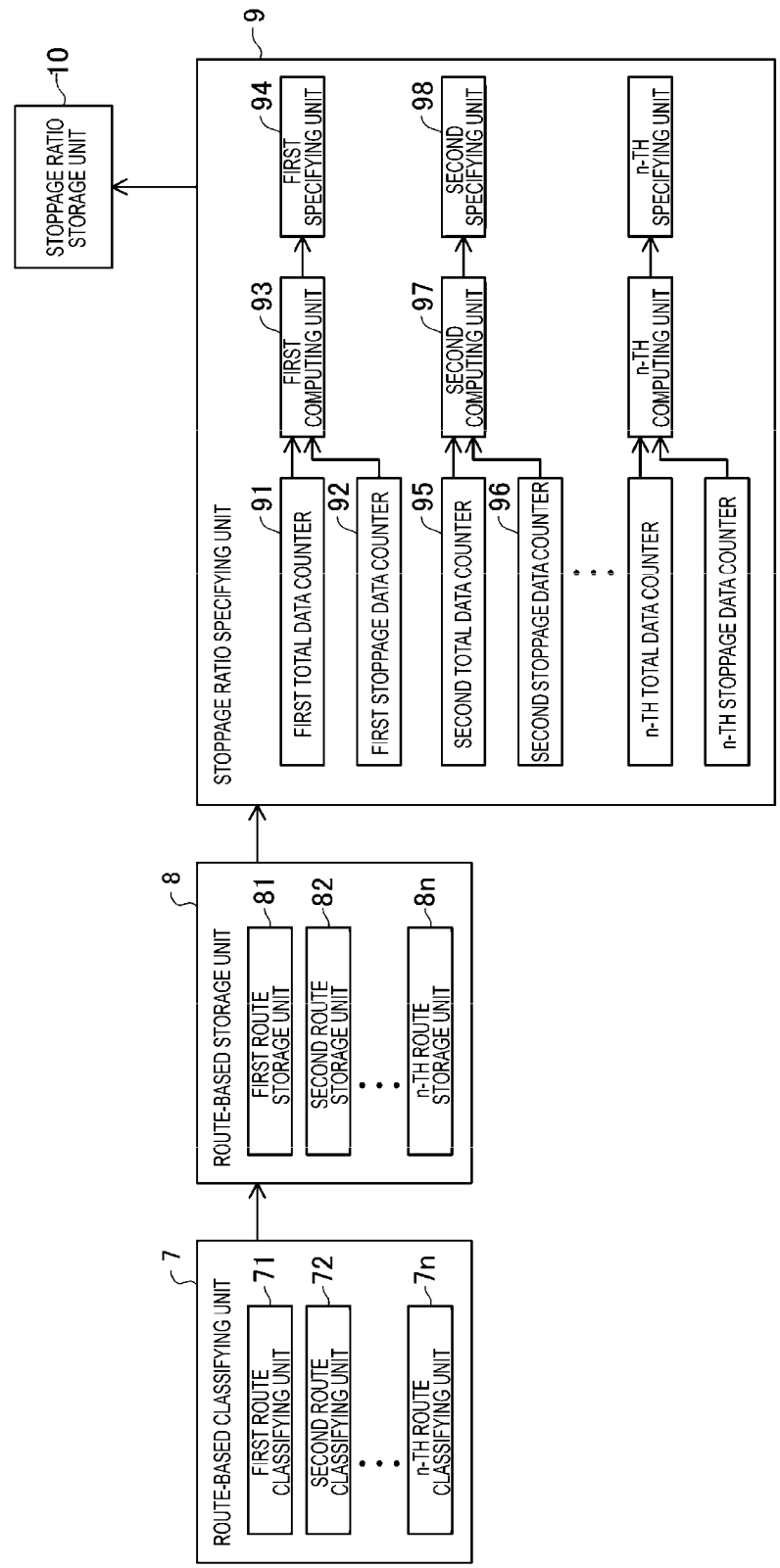
FIG. 2 is a block diagram illustrating a detailed configuration of the stoppage ratio specifying unit according to the embodiment of the present invention.

The above drive history data classified for each route is stored in association with the target route, respectively, in a first route storage unit 81, a second route storage unit 82, ..., an n-th route storage unit 8n within the route-based storage unit 8 (see FIG. 2).

The stoppage ratio specifying unit 9 specifies a stoppage ratio for each classified route. The stoppage ratio indicates a ratio, by which the probe car stops at the target intersections. The stoppage ratio specifying unit 9 may specify the stoppage ratio when the number of drive history data stored in each route storage unit within the route-based storage unit 8 becomes equal to or greater than a predetermined threshold value. The specified stoppage ratios are stored in the stoppage ratio storage unit 10.

A detailed configuration of the stoppage ratio specifying unit 9 will be described with reference to FIG. 2.

The stoppage ratio specifying unit 9 includes a first total data counter 91, a first stoppage data counter 92, a first computing unit 93, and a first specifying unit 94 so as to specify the stoppage ratio for the drive history data stored in the first route storage unit 81 within the route-based storage unit 8.

The first total data counter 91 counts the number of the total data of the drive history data stored in the first route storage unit 81, and the first stoppage data counter 92 counts the number of the stoppage data among the drive history data stored in the first route storage unit 81. The stoppage data means the drive history data indicating that the vehicle stops at the target intersection. For example, if the drive history data indicates that the vehicle speed is zero at the target intersection, the drive history data serves as the stoppage data. The vehicle speed may be determined at the target intersection. Alternatively, the vehicle speed may also be determined in a segment between the passing-through intersection and the target intersection. Also, if the drive history data indicates that the vehicle speed is zero in a segment from a point, which is a predetermined distance (for example, 30 m) upstream of the target intersection, to the target intersection, the drive history data may be serve as the stoppage data.

The first computing unit 93 computes a ratio of the number counted by the first stoppage data counter 92 to the number counted by the first total data counter 91.

The first specifying unit 94 specifies the computed ratio as the first stoppage ratio. The specified stoppage ratio is stored in the stoppage ratio storage unit 10 in association with the route.

The stoppage ratio specifying unit 9 further includes a total data counter, a stoppage data counter, and a computing unit, and a specifying unit, respectively for the corresponding storage unit, so as to specify each stoppage ratio of the drive history data stored in each of the second route storage unit 82 to the n-th route storage unit 8n. The specified stoppage ratio is stored in the stoppage ratio storage unit 10 in association with the route.

Figure 3:
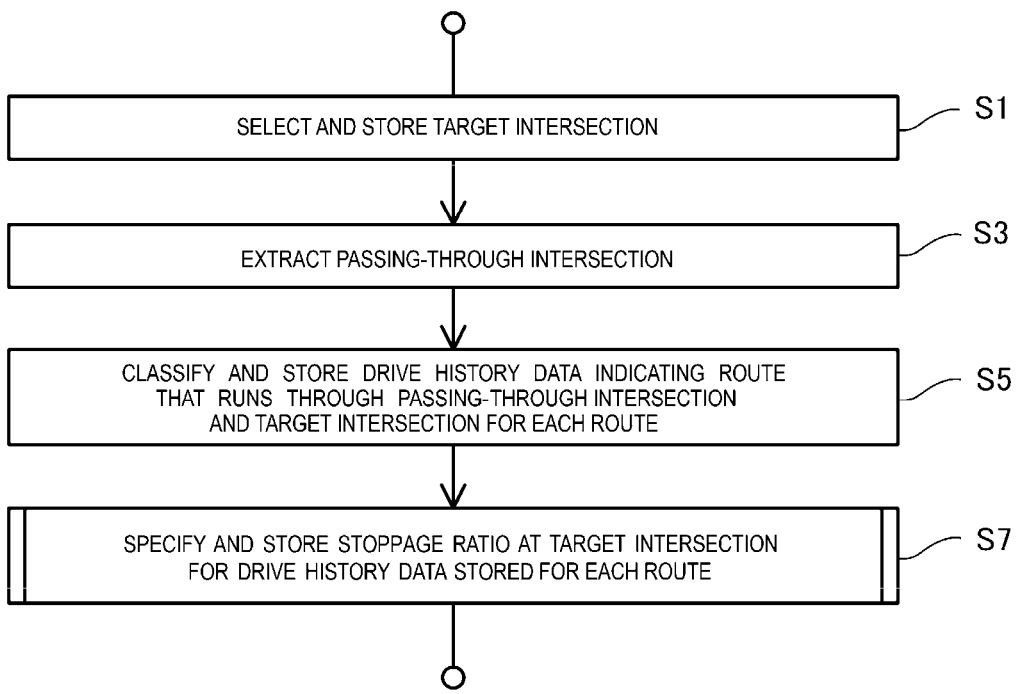
FIG. 3 is a flow chart illustrating operation of the intersection stoppage ratio specifying device according to the embodiment of the present invention.
Figure 4:
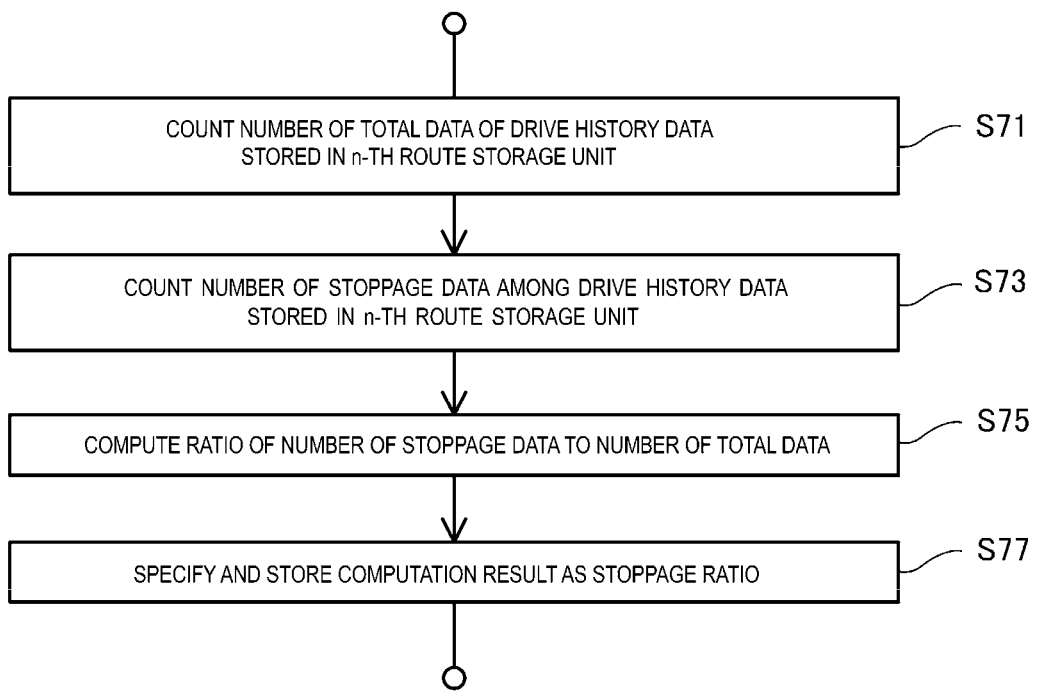
FIG. 4 is a flow chart illustrating detailed operation in step 7 according to the embodiment of the present invention.

Operation of the intersection stoppage ratio specifying device 1 shown in FIGS. 1 and 2 will be described with reference to FIGS. 3 and 4.

Control refers the traffic signal intersection information storage unit 2 at step 1. Then, control selects a traffic signal intersection, at which the stoppage ratio is to be specified, as the target intersection, and stores the target intersection.

At step 3, control refers the traffic signal intersection information storage unit 2 and the target intersection storage unit 5 so as to extract a traffic signal intersection, which is passed immediately before the vehicle reaches the target intersection selected at step 1, as the passing-through intersection.

Then, control proceeds to step 5, where control classifies the drive history data, which indicates a route that runs through the extracted passing-through intersection and the target intersection stored in the target intersection storage unit 5, among the drive history data stored in the drive history data storage unit 3, for each route, and stores the classified drive history data.

Control proceeds to at step 7, where control specifies the stoppage ratio at the target intersection for the drive history data stored for each route, and stores the specified stoppage ratio.

Detailed operation at step 7 will be described with reference to FIG. 4.

At step 71, control counts the number of total data of the drive history data, which is classified for each route and stored at step 5. Then, control proceeds to step 73, where control counts the number of the stoppage data among the drive history data.

Then, at step 75, control computes a ratio of the number of the stoppage data to the number of total data based on the number of total data counted at step 71 and the number of the stoppage data counted at step 73. Then, control proceeds to step 77, where control specifies the computation result as the stoppage ratio at the target intersection for the target route, and then control stores the specified result in the stoppage ratio storage unit 10.

Figure 5:
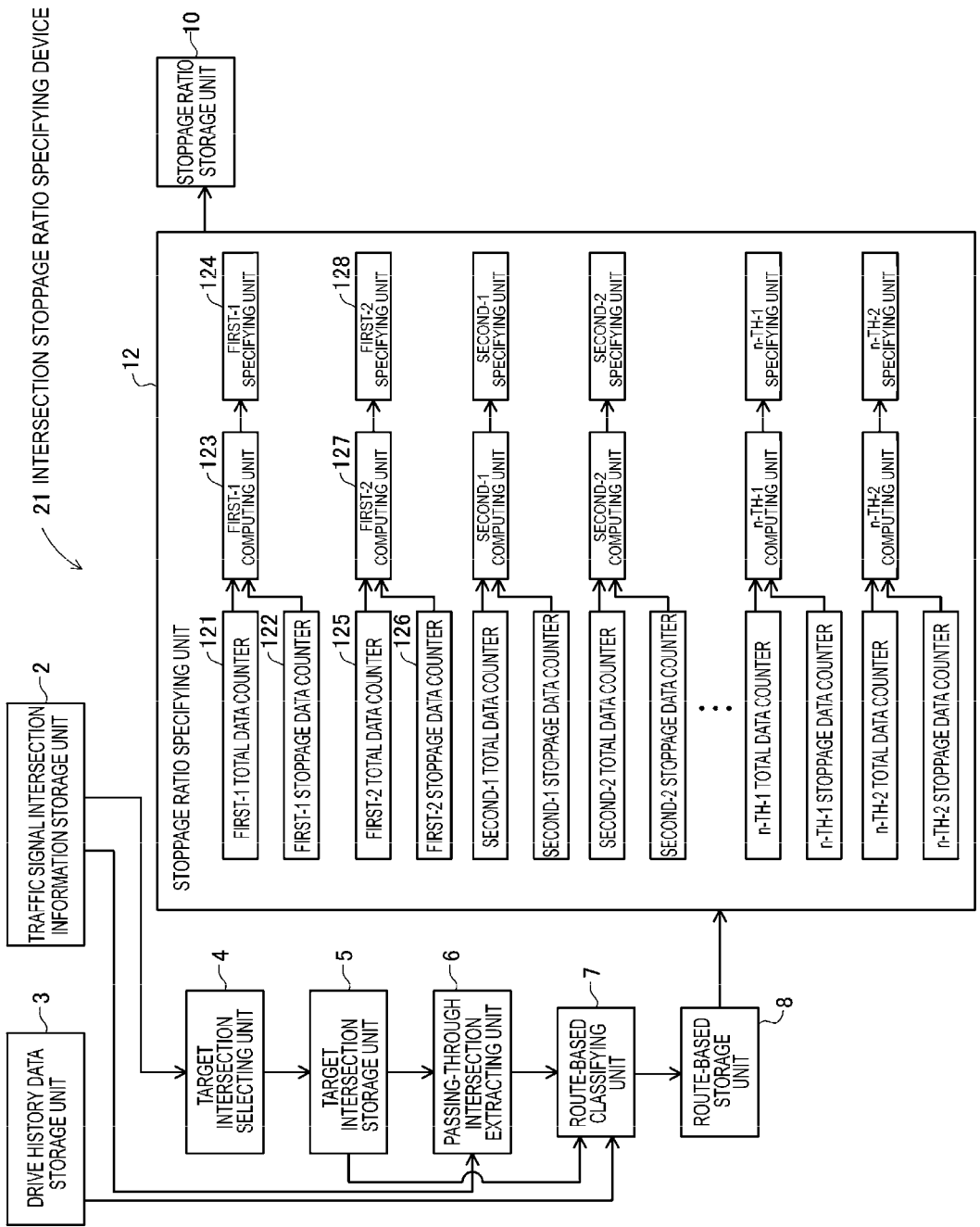
FIG. 5 is a block diagram illustrating a configuration of an intersection stoppage ratio specifying device according to other embodiment of the present invention.

FIG. 5 shows an intersection stoppage ratio specifying device 21 according to other embodiment. In FIG. 5, components similar to those in FIGS. 1 and 2 are designated by the same numerals, and the explanation of the similar components will be partially omitted.

FIG. 5 shows the intersection stoppage ratio specifying device 21 that is capable of specifying the stoppage ratio at the target intersection under preassigned conditions. In other words, the device 21 is different from the intersection stoppage ratio specifying device 1 shown in FIG. 2 in that the device 21 has a stoppage ratio specifying unit 12 instead of the stoppage ratio specifying unit 9.

The stoppage ratio specifying unit 12 includes a first-1 total data counter 121 and a first-2 total data counter 125 instead of the first total data counter 91 within the stoppage ratio specifying unit 9. Also, the stoppage ratio specifying unit 12 includes a first-1 stoppage data counter 122 and a first-2 stoppage data counter 126 instead of the first stoppage data counter 92. Furthermore, the stoppage ratio specifying unit 12 includes a first-1 computing unit 123 and a first-2 computing unit 127 instead of the first computing unit 93, and includes a first-1 specifying unit 124 and a first-2 specifying unit 128 instead of the first specifying unit 94.

The first-1 total data counter 121 counts the number of the drive history data, which satisfies a first condition, among the drive history data stored in the first route storage unit 81.

The first-1 stoppage data counter 122 counts the number of the stoppage data, which satisfies the first condition, among the drive history data stored in the first route storage unit 81.

The first-1 computing unit 123 computes the ratio of the number of the data, which is counted by the first-1 stoppage data counter 122, to the number of the data, which is counted by the first-1 total data counter 121.

The first-1 specifying unit 124 specifies the computation result as the stoppage ratio. The specified stoppage ratio is stored in the stoppage ratio storage unit 10 in association with the condition and route.

The first-2 total data counter 125, the first-2 stoppage data counter 126, the first-2 computing unit 127 and the first-2 specifying unit 128 function similar to the above, and the stoppage ratio at the target intersection of the drive history data, which satisfies a second condition, is specified among the drive history data stored in the first route storage unit 81.

The intersection stoppage ratio specifying device 21 employs the pre-assigned conditions that include the first condition, where the vehicle stops at the passing-through intersection, and the second condition, where the vehicle passes the passing-through intersection without stoppage. The numbers of total data counters, stoppage data counters, computing units, and specifying units may be determined as required based on the number of the conditions, respectively, for the first route storage unit 81 to the n-th route storage unit 8n. If the stoppage ratio at the target intersection is specified based on such conditions, it is possible to specify the stoppage ratio in consideration of the cooperative operation timing of the traffic signals at the passing-through intersection and the target intersection. In other words, when the vehicle driving on the guidance route, for example, stops at the passing-through intersection, the driver is informed of the specified stoppage ratio based on the first condition at the target intersection. Therefore, it is possible to accurately notify the driver, who stops the vehicle at the intersection (passing-through intersection), of the stoppage ratio of the next intersection (target intersection) to pass.

Also, in another example, the condition may include the first condition of weekday (Monday to Friday) and the second condition of Holiday (Saturday, Sunday, feast day). The condition may be assigned as required depending on intention. For example, the condition may include a driving time zone, a day of week, a drive lane, weather, and the like. When the condition employ the drive lane or the weather, it is possible to count the number of data, provided that the drive history data includes traffic lane based information, weather information for each area, information for operation of wipers and headlamps, or the like, or provided that the above information is associated with the drive history data.

Furthermore, the assigned condition may be a traffic signal waiting time at the target intersection. For example, the first condition is that the waiting time is less than 10 seconds, and the second condition is that the waiting time is equal to or greater than 10 seconds and less than 30 seconds, the third condition is that the waiting time is equal to or greater than 30 seconds. Based on the above conditions, the stoppage ratio is specified. Also, the specified stoppage ratio may be informed together with the traffic signal waiting time or the corresponding condition. The single assigned conditions may be employed, or two or more conditions may be alternatively assigned.

Figure 6:
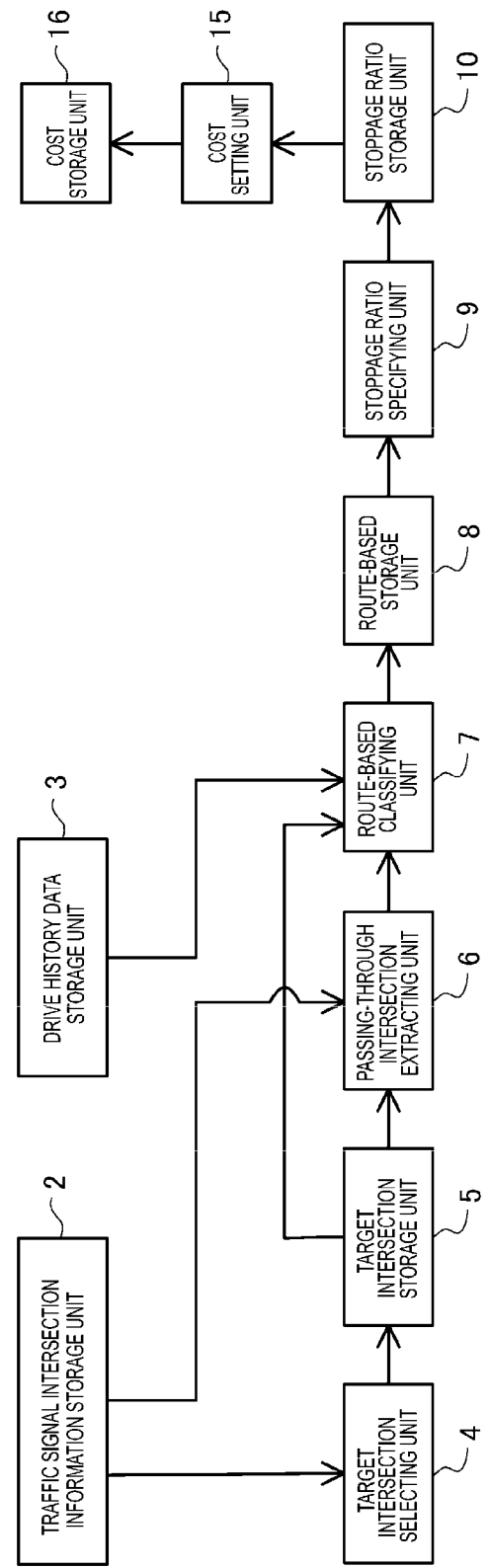
FIG. 6 is a block diagram illustrating a configuration of the intersection stoppage ratio specifying device according to the other embodiment of the present invention.

FIG. 6 shows an intersection stoppage ratio specifying device 31 of another embodiment. In FIG. 6, components similar to those in FIGS. 1, 2 and 5 are designated by the same numerals, and the description of the similar components will be partially omitted.

The intersection stoppage ratio specifying device 31 shown in FIG. 6 has a cost setting unit 15 and a cost storage unit 16 in addition to the components of the intersection stoppage ratio specifying device 1 shown in FIG. 1.

The cost setting unit 15 sets cost to a node, which corresponds to the target intersection, in association with the route based on the stoppage ratio of the target intersection stored in the stoppage ratio storage unit 10. The set cost is stored in the cost storage unit 16. The use of the above set cost enables the classification of the traffic signal intersection having the specified stoppage ratio. Then, the use of the classified traffic signal intersection information enables the path guidance by the navigation system to provide a fuel saving guidance route, realizing more smooth drive. Also, it may be possible to, in advance, exclude a target intersection having the high stoppage ratio from the guidance route. Also, it may be possible to, in advance, exclude the target intersection and/or a route, which is located near the above target intersection, from the guidance route. Alternatively, it may be possible to advise the driver to decelerate the vehicle at a position upstream of the above target intersection. As a result, it is possible to suppress the excessive fuel consumption.

The navigation device of the present invention is configured to directly use the information of the above cost storage unit.

Figure 7:
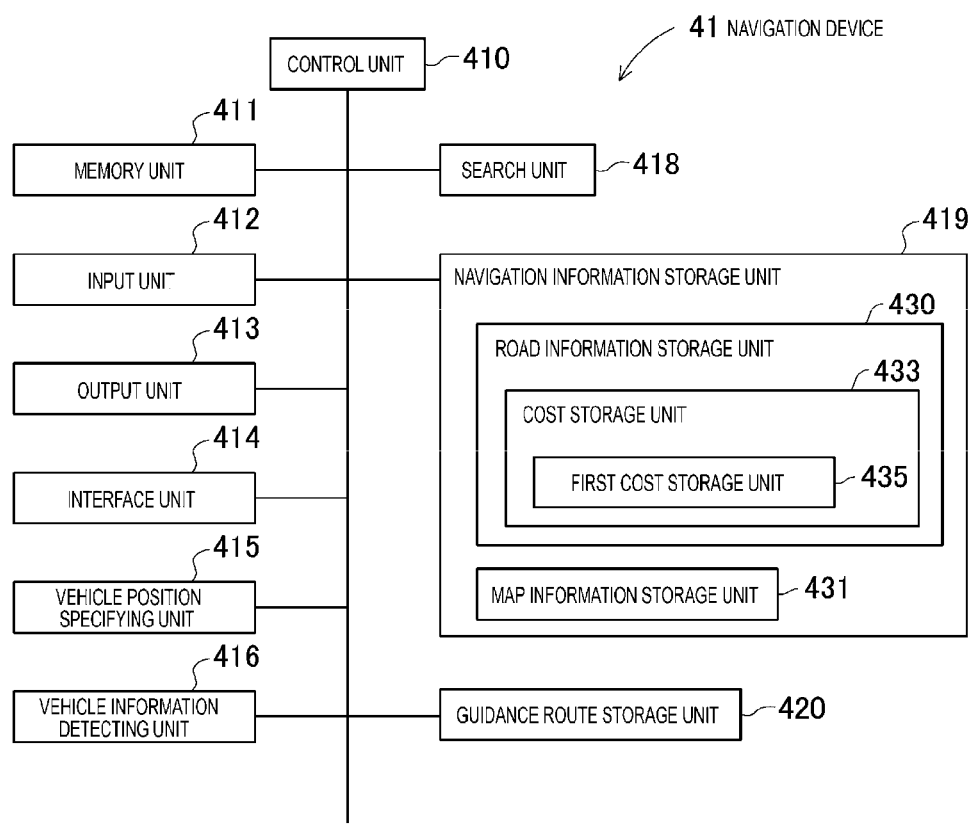
FIG. 7 is a block diagram illustrating a configuration of navigation device according to an example of the present invention.

FIG. 7 is a function block diagram of a navigation device 41 of the example of the present invention.

The navigation device 41 includes a control unit 410, a memory unit 411, an input unit 412, an output unit 413, an interface unit 414, a vehicle position specifying unit 415, a vehicle information detecting unit 416, a search unit 418, a navigation information storage unit 419, and a guidance route storage unit 420.

The control unit 410 is a computer device having a CPU, a buffer memory, and other devices, and controls other components of the navigation device 41.

The memory unit 411 stores computer programs. The control unit 410 serving as the computer device reads the computer programs and executes the programs. The computer program may be stored in a general medium, such as a DVD.

The input unit 412 is used to set the origin or the destination. The input unit 412 employs a touch sensitive panel input device that works with the content in the display.

The output unit 413 includes a display so as to provide map information required for the navigation, and other information. The output unit 413 may also include a voice navigation device.

The interface unit 414 connects the navigation device 41 with a wireless network or the like.

The vehicle position specifying unit 415 specifies a present position of a user terminal by using a GPS device or a gyro device.

The vehicle information detecting unit 416 detects vehicle information indicative of the vehicle drive state. The vehicle information may preferably include, for example, speed information, an engine rotational speed, an accelerator position, a stop lamp, gear shift lever information, ID information that identifies the probe car. Furthermore, the vehicle information may include coordinate information, time information, direction information, height information, fore-and-aft acceleration, a yaw rate, an ABS warning lamp, a fuel consumption, an electric power remaining capacity, and a steering angle (rotation angle information of handle), and the like.

The search unit 418 searches for a path from the assigned origin to the destination. When a vehicle user sets the destination, the navigation device starts and searches for a guidance route to the destination. During the search, control refers a cost storage unit 433, which will be described later, and determines a guidance route so as to reduce computed path cost. The searched guidance route is stored in the guidance route storage unit 420, which will be also described later.

The navigation information storage unit 419 has a road information storage unit 430 and a map information storage unit 431.

The road information storage unit 430 stores road information that defines characteristics of each road element, such as the road or the intersection. Examples of the road information that defines the characteristics of the road (link) include a road type, a road width, the number of traffic lanes, driving rules, and the like. The road information storage unit 430 has the cost storage unit 433.

The cost storage unit 433 stores cost information, which corresponds to characteristics of the nodes and the links, in accordance with each node information and each link information stored in the map information storage unit 431. Examples of the characteristics of the nodes and the links include the road type, the road width, the number of traffic lanes, and the like.

A first cost storage unit 435 stores, as first cost, the cost set by the intersection stoppage ratio specifying device of the present invention. The first cost may be used for the path search executed by the search unit 418 along with other cost stored in the cost storage unit 433.

The map information storage unit 431 stores map information. The map information includes information related to the road elements for defining the map information, such as the link and the node. Also, the map information includes information drawn in the map.

The guidance route storage unit 420 stores the path searched for by the search unit 418 as above. The guidance route is preferably stored along with information related to shape of the link and the like.

Figure 8:
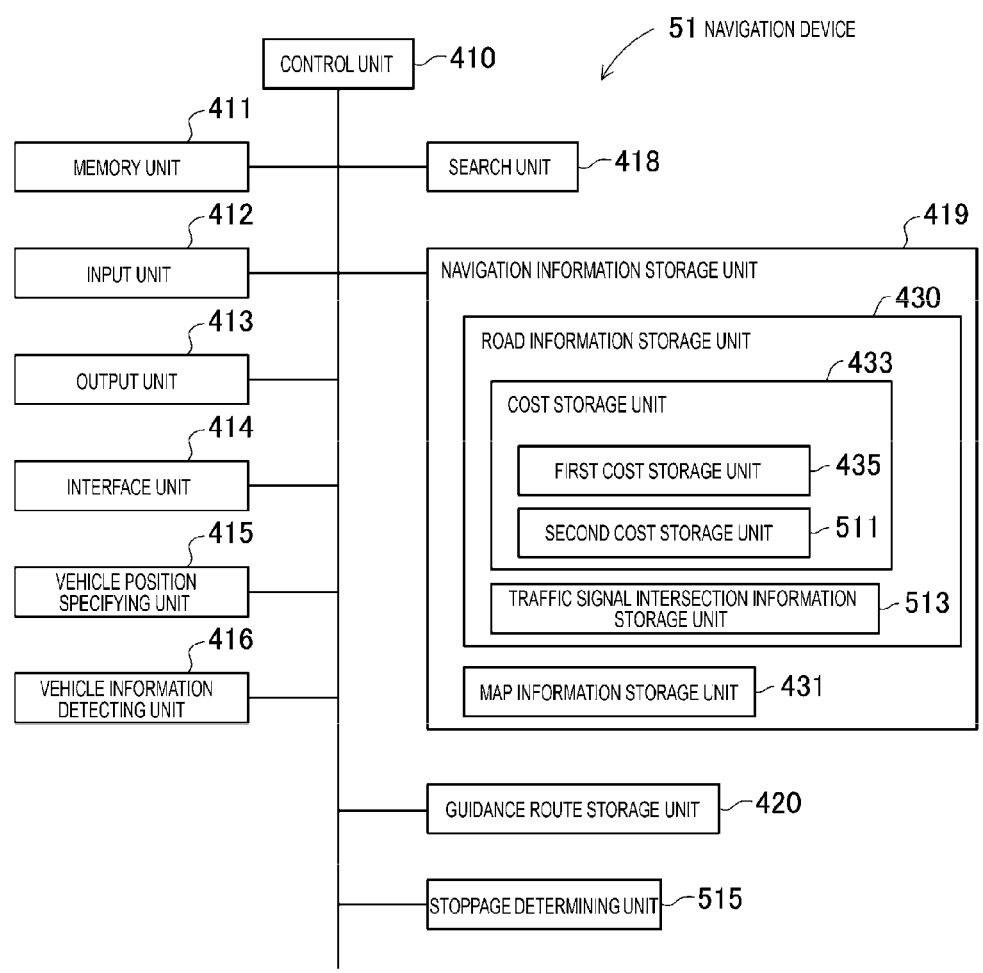
FIG. 8 is a block diagram illustrating a configuration of a navigation device of other example of the present invention.

FIG. 8 shows a function block diagram of a navigation device 51 of other example. In FIG. 8, components similar to those in FIG. 7 are designated by the same numerals, and thereby the description of the similar components will be partially omitted.

The navigation device 51 shown in FIG. 8 further has a second cost storage unit 511, a traffic signal intersection information storage unit 513, and a stoppage determining unit 515 in addition to the components of the navigation device 41 shown in FIG. 7.

The second cost storage unit 511 stores second cost, which is set by referring the stoppage ratio at the target intersection for a case, where the vehicle stops at the passing-through intersection. The second cost is employed by the search unit 418 for re-searching for the path when the stoppage determining unit 515, which will be described later, determines that the vehicle driving on the guidance route stops at the passing-through intersection. In the navigation device 51, the first cost storage unit 435 stores cost (first cost) similar to the example in FIG. 7, and the first cost is set by referring the specified stoppage ratio despite whether or not the vehicle stops at the passing-through intersection. In the navigation device 51, the initial guidance route search is executed by referring the first cost. In the re-searching of the route executed when it is determined that the vehicle stops at the passing-through intersection, the second cost is referred in prior to the first cost.

The traffic signal intersection information storage unit 513 stores the traffic signal intersection information. The traffic signal intersection information is information for specifying intersections in the map, at which traffic signals are installed. For example, the traffic signal intersection information may employ the combination of the node, which serves as the map information, and the existence information of traffic signals, which serves as the road information. The traffic signal intersection information storage unit 513 may be optionally provided as required depending on the process executed in the stoppage determining unit 515, which will be described later.

The stoppage determining unit 515 refers the guidance route storage unit 420 and the first cost storage unit 435 to determine, based on the results obtained by the vehicle position specifying unit 415 and the vehicle information detecting unit 416, whether the vehicle driving on the guidance route stopped at the passing-through intersection on the route associated with the first cost. When the stoppage determining unit 515 determines that the vehicle stopped, the stoppage determining unit 515 causes the search unit 418 to re-search a path in the condition that the passing-through intersection, at which the vehicle stops, is set as the origin. In the re-searching of the path, the search unit 418 refers the above second cost storage unit 511 in prior to any other storage unit. More specifically, the search unit 418 refers, first, the second cost storage unit 511. If the second cost storage unit 511 does not have the required data, the search unit 418, then, refers the first cost storage unit 435. In the above, the determination of whether or not the vehicle stopped may be made in any method. For example, the determination may be made when the vehicle information detecting unit 416 detects the speed information indicating that the vehicle speed becomes zero. Alternatively, the stoppage determining unit 515 may refer the traffic signal intersection information storage unit 513. When the vehicle stops at the traffic signal intersection, the stoppage determining unit 515 may execute the above process to output a signal to the search unit 418 for the re-searching of the guidance route.

Details will be described with reference to FIG. 9.

Figure 9:
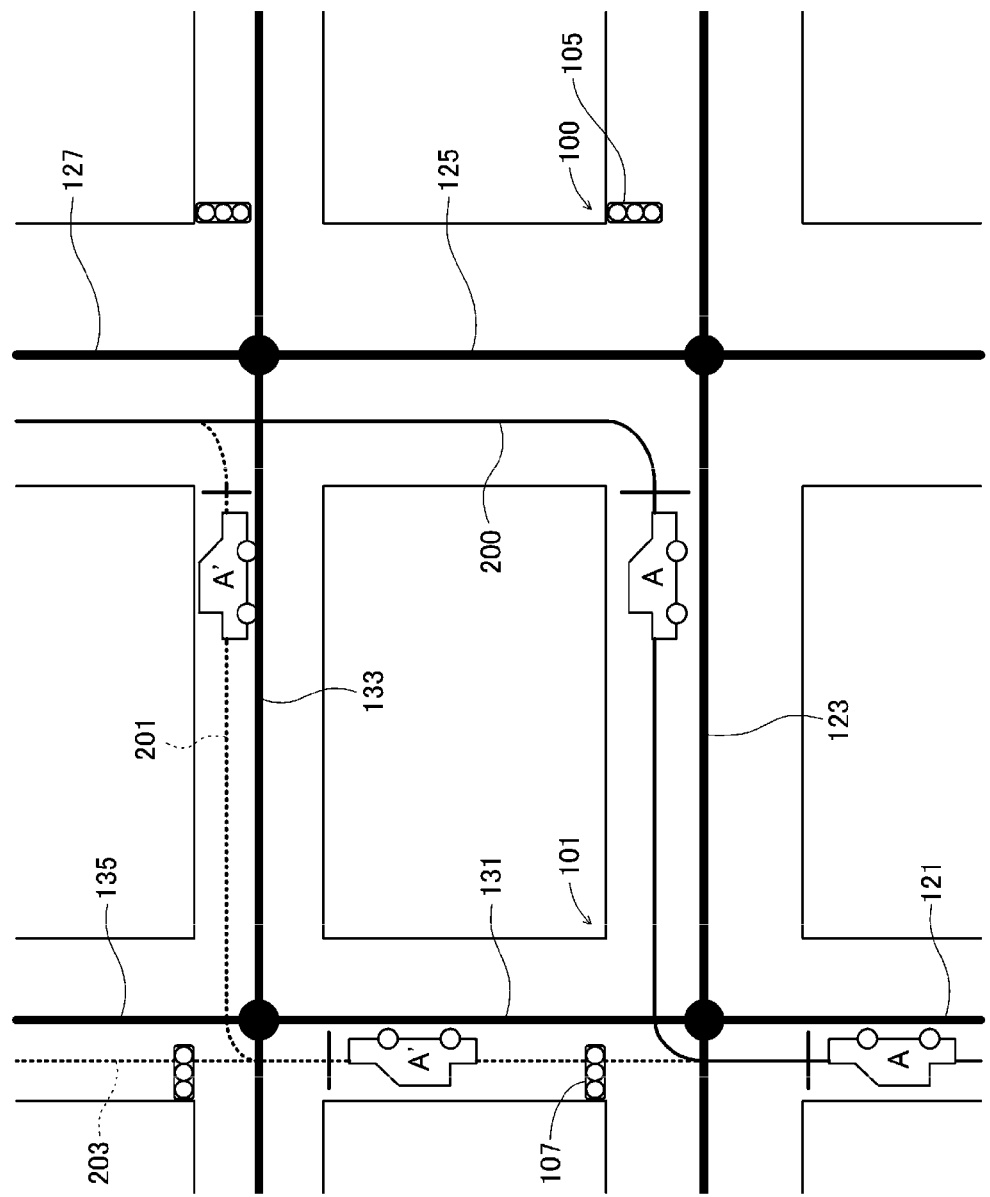
FIG. 9 is a schematic diagram for explaining re-search of the guidance route by a search unit when the vehicle stops at the passing-through intersection.

FIG. 9 shows a target intersection 100, a passing-through intersection 101, and a guidance route 200.

The guidance route 200 is searched for by the search unit 418 after the search unit 418 refers the first cost storage unit 435.

A vehicle A drives along the guidance route 200 on a link 121, and when the vehicle A stops at the passing-through intersection 101, the signal is outputted to the search unit 418 for causing the search unit 418 to re-search for the guidance route.

Based on the signal, the search unit 418 re-searches the guidance route by referring the cost storage unit 433 to minimize the cost.

For example, in FIG. 9, when the guidance route 201, which is suggested along a link 131 and a link 133, has the cost smaller than that of the guidance route 200, the guidance route storage unit 420 informs the vehicle driver of the guidance route 201.

Figure 10:
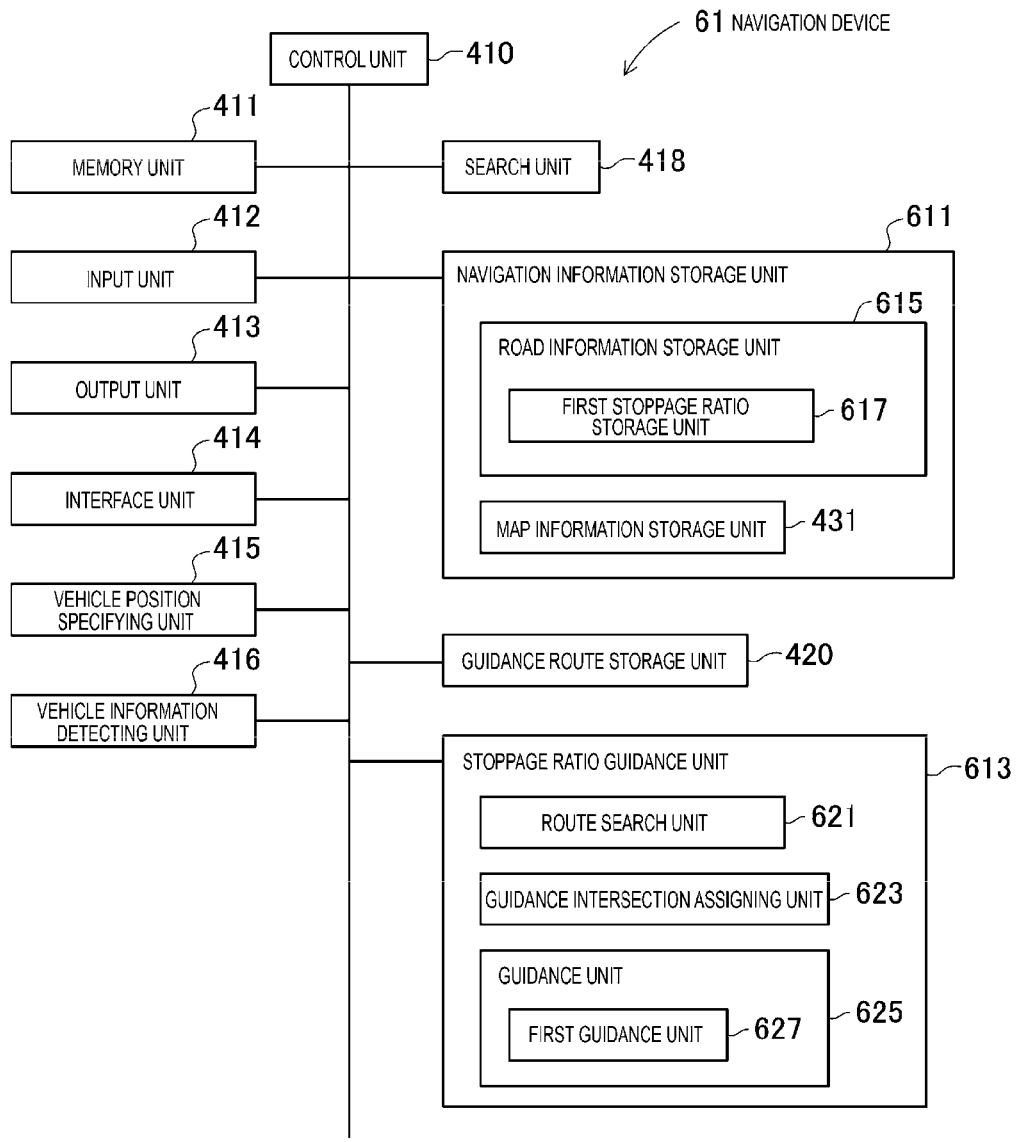
FIG. 10 is a block diagram illustrating a configuration of the navigation device of other example of the present invention.

FIG. 10 shows a function block diagram of a navigation device 61 of another example.

The navigation device 61 shown in FIG. 10 is configured to directly use information related to the stoppage ratio specified by the intersection stoppage ratio specifying device of the present invention. In FIG. 10, components similar to those in FIGS. 7 and 8 are designated by the same numerals, and thereby the description of the similar components will be partially omitted.

The navigation device 61 includes a first stoppage ratio storage unit 617 instead of the cost storage unit 433 of the navigation device 41 shown in FIG. 7, and further includes a stoppage ratio guidance unit 613.

The first stoppage ratio storage unit 617 stores the stoppage ratio, which is specified by the intersection stoppage ratio specifying device of the present invention, as a first stoppage ratio in association with the route. The navigation device 61 informs the vehicle driver driving on the guidance route of the information related to the first stoppage ratio.

The stoppage ratio guidance unit 613 includes a route search unit 621, a guidance intersection assigning unit 623, and a guidance unit 625.

The route search unit 621 refers the guidance route storage unit 420 and the first stoppage ratio storage unit 617, and searches the route associated with the first stoppage ratio in the guidance route.

The guidance intersection assigning unit 623 assigns a target intersection, at which the stoppage ratio is informed, in the route searched for by the route search unit 621.

The guidance unit 625 has a first guidance unit 627 that informs the information related to the first stoppage ratio.

The first guidance unit 627 informs the information related to the first stoppage ratio at the guidance intersection assigned by the guidance intersection assigning unit 623. The first stoppage ratio is outputted through the output unit 413 as image information or audio information. The stoppage ratio may be started to be informed around the guidance intersection at any timing. For example, the stoppage ratio may be started to be informed when the vehicle reaches a point a predetermined distance (for example, 50 m) upstream of the guidance intersection. Alternatively, the stoppage ratio may be started to be informed when the vehicle passes the passing-through intersection. Also, the informing of the stoppage ratio may be ended at any timing. For example, the informing of the stoppage ratio may be ended when the vehicle reaches the target intersection.

Figure 11:
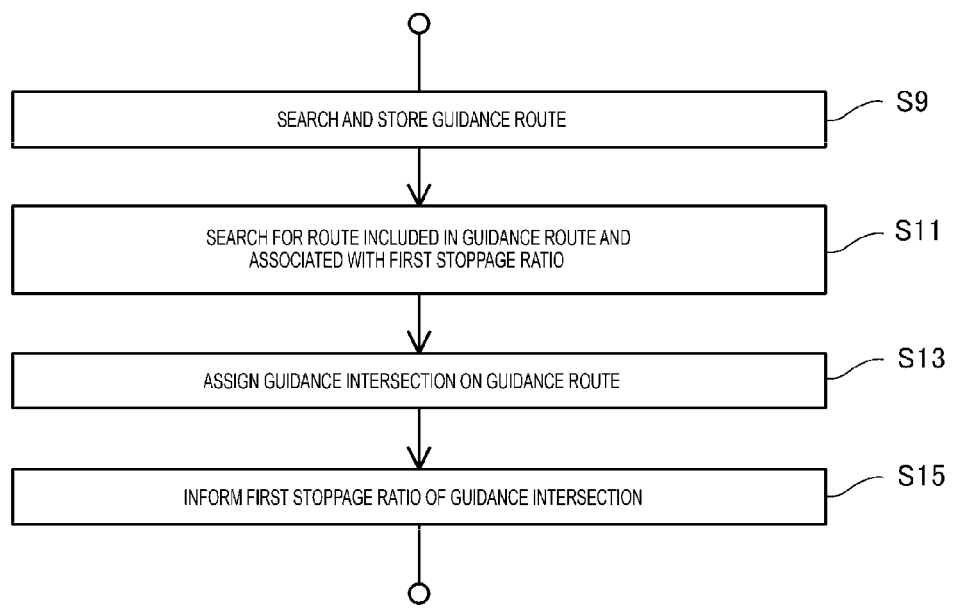
FIG. 11 is a flow chart illustrating operation of the navigation device of other example of the present invention.

Operation of a navigation device 61 shown in FIG. 10 will be described with reference to FIG. 11.

When the input unit 412 receives the origin and the destination, the search unit 418 searches for a guidance route from the origin to the destination and stores the guidance route in the guidance route storage unit 420 (step 9).

Control proceeds to step 11, where the route search unit 621 within the stoppage ratio guidance unit 613 refers the first stoppage ratio storage unit 617 to search for a route included in the guidance route among the stored routes associated with the stoppage ratio while the vehicle drives on the guidance route.

The guidance intersection assigning unit 623 assigns a target intersection, which is located on the guidance route, and which is included in the searched route, as a guidance intersection (step 13). Then, the stoppage ratio at the assigned guidance intersection is informed by the first guidance unit 627 (step 15).

Figure 12:
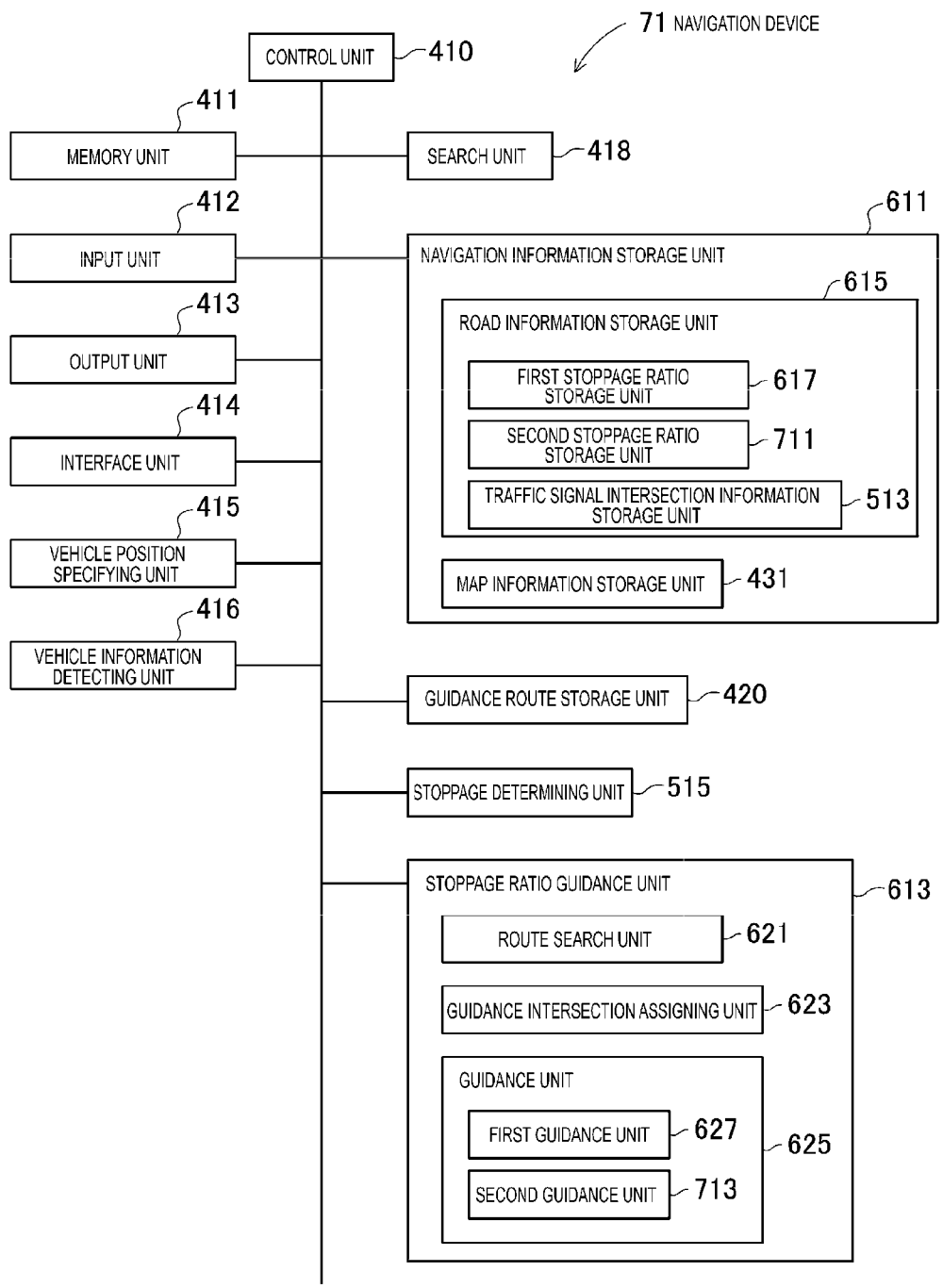
FIG. 12 is a block diagram illustrating a configuration of the navigation device of other example of the present invention.

FIG. 12 shows a function block diagram of a navigation device 71 of other example. In FIG. 12, components similar to those in FIGS. 7, 8 and 10 are designated by the same numerals, and thereby the description of the similar components will be partially omitted.

The navigation device 71 shown in FIG. 12 further has a second stoppage ratio storage unit 711, the traffic signal intersection information storage unit 513, the stoppage determining unit 515, and a second guidance unit 713 in addition to the components of the navigation device 61 shown in FIG. 10.

The second stoppage ratio storage unit 711 stores the stoppage ratio, which is specified by the intersection stoppage ratio specifying device of the present invention, and which is for the target intersection when the vehicle stops at the passing-through intersection, as a second stoppage ratio in association with the route. The navigation device 71 informs the vehicle driver of information related to the second stoppage ratio when the stoppage determining unit 515 determines that the vehicle driving on the guidance route stops at the passing-through intersection.

The second guidance unit 713 informs information related to the second stoppage ratio for the guidance intersection assigned by the guidance intersection assigning unit 623. The stoppage ratio for the guidance intersection may be started to be informed at any timing. For example, the stoppage ratio may be started to be informed when the stoppage determining unit 515 outputs the signal the indicating that the vehicle stops at the passing-through intersection.

Operation of a navigation device 71 shown in FIG. 12 will be described with reference to FIG. 13. In FIG. 13, steps similar to those in FIG. 11 are designated by the same numerals, and thereby the description of the similar steps will be partially omitted.

In FIG. 13, at step 17, control refers the guidance route storage unit 420 and the traffic signal intersection information storage unit 513, and determines, based on the results obtained by the vehicle position specifying unit 415 and the vehicle information detecting unit 416, whether the vehicle driving on the guidance route stopped at the traffic signal intersection. Then, control outputs the signal indicating the vehicle stop to the stoppage ratio guidance unit 613.

The second guidance unit 713 refers the second stoppage ratio storage unit 711 based on the signal, and informs the second stoppage ratio at the guidance intersection (step 19).

Embodiments and examples of the present invention have been described as above. Two or more embodiments may be combined. Alternatively, part of one of the above embodiments may be executed. Furthermore, parts of two or more embodiments may be combined.

Following items are described below.

The first-A aspect of the present invention is defined as follows. More specifically, a method for specifying an intersection stoppage ratio includes:

a target intersection selecting step for selecting, as a target intersection, a traffic signal intersection, for which a stoppage ratio is specified, from a traffic signal intersection information storage unit that stores information related to traffic signal intersections, a passing-through intersection extracting step for extracting, as a passing-through intersection, the traffic signal intersection, which is passed immediately before reaching the target intersection, based on a predetermined rule;

a route-based classifying step for classifying drive history data of a probe car for each route that runs from the passing-through intersection to the target intersection;

a stoppage ratio specifying step for specifying the stoppage ratio for each classified route, the stoppage ratio being a ratio of the probe car stoppage at the target intersection.

According to the invention defined by the first-A aspect defined as above, it is possible to achieve the effects equivalent to those of the above first aspect.

The second-A aspect of the present invention is defined as follows. More specifically, in the intersection stoppage ratio specifying method defined in the first-A aspect, the stoppage ratio is specified under each assigned condition.

According to the invention defined by the second-A aspect defined as above, it is possible to achieve the effects equivalent to those of the above second aspect.

The third-A aspect of the present invention is defined as follows. More specifically, in the intersection stoppage ratio specifying method defined in the second-A aspect, the assigned condition is that the probe car stops at the passing-through intersection.

According to the invention defined by the third-A aspect defined as above, it is possible to achieve the effects equivalent to those of the above third aspect.

The fourth-A aspect of the present invention is defined as follows. More specifically, in the intersection stoppage ratio specifying method defined in the second-A or third-A aspects, the assigned condition is a time zone and/or a day of week.

According to the invention defined by the fourth-A aspect defined as above, it is possible to achieve the effects equivalent to those of the above fourth aspect.

The fifth-A aspect of the present invention is defined as follows. More specifically, in the intersection stoppage ratio specifying method as defined in any one of the second-A to fourth-A aspects, the assigned condition is a traffic signal waiting time at the target intersection.

According to the invention defined by the fifth-A aspect defined as above, it is possible to achieve the effects equivalent to those of the above fifth aspect.

The sixth-A aspect of the present invention is defined as follows. More specifically, the intersection stoppage ratio specifying method defined in any one of the first-A to fifth-A aspects includes a cost setting step for setting cost based on the specified stoppage ratio.

According to the invention defined by the sixth-A aspect defined as above, it is possible to achieve the effects equivalent to those of the above sixth aspect.

The seventh-A aspect of the present invention is defined as follows. More specifically, a navigation method includes:

a searching step for searching a path from an origin to a destination based on a predetermined rule, wherein the searching step refers first cost, which is set by the intersection stoppage ratio specifying method defined in the sixth-A aspect, so as to determine the path.

According to the invention defined by the seventh-A aspect defined as above, it is possible to achieve the effects equivalent to those of the above seventh aspect.

The eighth-A aspect of the present invention is defined as follows. More specifically, the navigation method defined in the seventh-A aspect includes a stoppage determining step for determining that the vehicle driving on the guidance route stops at the passing-through intersection, wherein:

when the stoppage determining step determines the vehicle stop, if second cost, which is set by referring the stoppage ratio at the target intersection for a case, where the vehicle stops at the passing-through intersection, is equal to or greater than a predetermined threshold value, the searching step researches for the path that runs from the passing-through intersection as the origin, the stoppage ratio being specified by the intersection stoppage ratio specifying method defined in the third-A aspect.

According to the invention defined by the eighth-A aspect defined as above, it is possible to achieve the effects equivalent to those of the above eighth aspect.

The ninth-A aspect of the present invention is defined as follows. More specifically, a navigation method includes:

a route searching step for referring a guidance route storage unit that stores a guidance route, which is searched for by a navigation system, so as to search the route, which is associated with a first stoppage ratio and is included in the guidance route, from a first stoppage ratio storage unit that stores first stoppage ratios in association with routes, the first stoppage ratios being specified by the intersection stoppage ratio specifying method defined in the first-A to sixth-A aspects;

a guidance intersection assigning step for assigning, as a guidance intersection, the target intersection, for which the first stoppage ratio is specified, in the searched route; and first guiding step for informing information related to the first stoppage ratio associated with the assigned guidance intersection.

According to the invention defined by the ninth-A aspect defined as above, it is possible to achieve the effects equivalent to those of the above ninth aspect.

The tenth-A aspect of the present invention is defined as follows. More specifically, the navigation method defined in the ninth-A aspect includes:

a stoppage determining step for determining that a vehicle driving on the guidance route stops at the passing-through intersection; and a second guiding step for informing information related to a second stoppage ratio associated with the assigned guidance intersection when the stoppage determining step determines that the vehicle stops, the second stoppage ratio being specified by the intersection stoppage ratio specifying method defined in the third-A aspect.

According to the invention defined by the tenth-A aspect defined as above, it is possible to achieve the effects equivalent to those of the above tenth aspect.

Also, the eleventh-A aspect defines a storage medium that stores the computer program defined in the above eleventh to fifteenth aspects.

The present invention is not limited to the above embodiments and the above examples of the invention. The present invention includes various modifications, provided that the modifications do not depart from the description of appended claims and are obviously thought by those skilled in the art.

DESCRIPTION OF THE NUMERALS 1 21 31 intersection stoppage ratio specifying device
2 traffic signal intersection information storage unit
3 drive history data storage unit
4 target intersection selecting unit
6 passing-through intersection extracting unit
7 route-based classifying unit
9 12 stoppage ratio specifying unit
15 cost setting unit
41 61 71 81 navigation device
418 search unit
435 first cost storage unit
420 guidance route storage unit
511 second cost storage unit
515 stoppage determining unit
613 stoppage ratio guidance unit
617 first stoppage ratio storage unit
627 first guidance unit
711 second stoppage ratio storage unit
713 second guidance unit

The invention claimed is:

1. An intersection stoppage ratio specifying device comprising:
a drive history data storage unit that stores drive history data of a probe car;
a traffic signal intersection information storage unit that stores information related to traffic signal intersections;
a target intersection selecting unit that selects, as a target intersection, the traffic signal intersection, for which a stoppage ratio is specified, from the traffic signal intersection information storage unit;
a passing-through intersection extracting unit that extracts, as a passing-through intersection, the traffic signal intersection, which the probe car passes immediately before the probe car reaches the target intersection, based on a predetermined rule;
a route-based classifying unit that classifies the drive history data for each route that runs from the passing-through intersection to the target intersection; and
a stoppage ratio specifying unit that specifies the stoppage ratio for each classified route, the stoppage ratio being a ratio of the probe car stoppage at the target intersection.

2. The intersection stoppage ratio specifying device according to claim 1, wherein the stoppage ratio is specified under each assigned condition.

3. The intersection stoppage ratio specifying device according to claim 2, wherein the assigned condition includes a condition, where the probe car stops at the passing-through intersection.

4. The intersection stoppage ratio specifying device according to claim 2, wherein the assigned condition includes a condition related to a time zone and/or a day of week.

5. The intersection stoppage ratio specifying device according to claim 2 wherein the assigned condition is a traffic signal waiting time at the target intersection.

6. The intersection stoppage ratio specifying device according to claim 1, further comprising:
a cost setting unit that sets cost based on the specified stoppage ratio.

7. A navigation device comprising:
a search unit that searches for a path from an origin to a destination based on a predetermined rule; and
a first cost storage unit that stores first cost, wherein the first cost is set based on a first stoppage ratio which is specified as a stoppage ratio of a probe car at a target intersection, by selecting, as a target intersection, a traffic signal intersection, for which a stoppage ratio is specified, from a traffic signal intersection information storage unit that stores information related to traffic signal intersections, by extracting, as a passing-through intersection, the traffic signal intersection, which is passed immediately before reaching the target intersection, based on a predetermined rule, by classifying drive history data of a probe car for each route including a route that runs from the passing-through intersection to the target intersection, and by specifying, as the first stoppage ratio, a ratio, by which the probe car stops at the target intersection, for each route wherein
the search unit determines the path by referring the first cost.

8. The navigation device according to claim 7, further comprising:
a stoppage determining unit that determines a vehicle driving on a guidance route, which is searched by a navigation system, stops at the passing-through intersection; and
a unit for setting a second cost basing on the first cost in a case where the probe car stops at the passing-through intersection, wherein
when the stoppage determining unit determines that the vehicle stops, if the second cost of the guidance route is equal to or greater than a predetermined threshold value, the search unit re-searches for the path that runs from the passing-through intersection as the origin.

9. A navigation device comprising:
a guidance route storage unit that stores a guidance route, which is searched for by a navigation system;
a first stoppage ratio storage unit that stores first stoppage ratios in association with routes;
a route search unit that refers the guidance route storage unit to search for the route, which is included in the guidance route and associated with the first stoppage ratio, from the first stoppage ratio storage unit;
a guidance intersection assigning unit that assigns, as a guidance intersection, the target intersection, for which the first stoppage ratio is specified, in the searched route; and
a first guidance unit that informs information related to the first stoppage ratio associated with the assigned guidance intersection, wherein
the first stoppage ratio is specified, as the stoppage ratio, a ratio, by which the probe car stops at the target intersection, for each route, by selecting, as a target intersection, a traffic signal intersection, for which a stoppage ratio is specified, from a traffic signal intersection information storage unit that stores information related to traffic signal intersections, by extracting, as a passing-through intersection, the traffic signal intersection, which is passed immediately before reaching the target intersection, based on a predetermined rule, and by classifying drive history data of a probe car for each route including a route that runs from the passing-through intersection to the target intersection.

10. The navigation device according to claim 9, further comprising:
a stoppage determining unit that determines a vehicle driving on the guidance route stops at the passing-through intersection;
a unit for specifying a second stoppage ratio basing on the first stoppage ratio in a case where the probe car stops at the passing-through intersection; and
a second guidance unit that informs information related to the second stoppage ratio associated with the assigned guidance intersection when the stoppage determining unit determines that the vehicle stops.

11. A non-transitory computer-readable storage medium containing a computer program for specifying an intersection stoppage ratio, the computer program causing a computer to perform the following functions:
selecting, as a target intersection, a traffic signal intersection, for which a stoppage ratio is specified, from a traffic signal intersection information storage unit that stores information related to traffic signal intersections;
extracting, as a passing-through intersection, the traffic signal intersection, which is passed immediately before reaching the target intersection, based on a predetermined rule;
classifying drive history data of a probe car for each route including a route that runs from the passing-through intersection to the target intersection; and
specifying, as the stoppage ratio, a ratio, by which the probe car stops at the target intersection, for each route.

12. The computer program according to claim 11, wherein the stoppage ratio is specified under each assigned condition.

13. The computer program according to claim 12, wherein the assigned condition is that the probe car stops at the passing-through intersection.

14. The computer program according to claim 12, wherein the assigned condition is one or both of a time zone and a day of week.

15. The computer program according to claim 12, wherein the assigned condition is a traffic signal waiting time at the target intersection.

16. The computer program according to claim 11, further causing the computer to perform the following function: setting cost based on the specified stoppage ratio.

17. A non-transitory computer-readable storage medium containing a computer program for navigation, causing a computer to perform the following functions:
searching for a path from an origin to a destination based on a predetermined rule, wherein the searching function determines the path by referring first cost, wherein
the first cost is set based on a first stoppage ratio which is specified as a stoppage ratio of a probe car at a target intersection by selecting, as a target intersection, a traffic signal intersection, for which a stoppage ratio is specified, from a traffic signal intersection information storage unit that stores information related to traffic signal intersections, by extracting, as a passing-through intersection, the traffic signal intersection, which is passed immediately before reaching the target intersection, based on a predetermined rule, by classifying drive history data of a probe car for each route including a route that runs from the passing-through intersection to the target intersection, and by specifying, as the first stoppage ratio, a ratio, by which the probe car stops at the target intersection, for each route.

18. The computer program according to claim 17, further causing the computer to perform the following functions:
determining that a vehicle driving on a guidance route, which is searched for by a navigation system, stops at the passing-through intersection, and
setting a second cost basing on the first cost in a case where the probe car stops at the passing-through intersection, wherein:
when the determining function determines that the vehicle stops, and the second cost of the guidance route is equal to or greater than a predetermined threshold value, the searching function re-searches for the path that runs from the passing-through intersection as the origin.

19. A non-transitory computer-readable storage medium containing a computer program for navigation, causing a computer to perform the following functions:
referring a guidance route storage unit that stores a guidance route, which is searched for by a navigation system, so as to search for a route, which is included in the guidance route and associated with a first stoppage ratio, from a first stoppage ratio storage unit the first stoppage ratio storage unit storing the first stoppage ratios in association with routes;
assigning, as a guidance intersection, a target intersection, for which the first stoppage ratio is specified, in the searched route; and
providing information related to the first stoppage ratio associated with the assigned guidance intersection wherein
the first stoppage ratio is specified, as the stoppage ratio, a ratio, by which the probe car stops at the target intersection, for each route, by selecting, as a target intersection, a traffic signal intersection, for which a stoppage ratio is specified, from a traffic signal intersection information storage unit that stores information related to traffic signal intersections, by extracting, as a passing-through intersection, the traffic signal intersection, which is passed immediately before reaching the target intersection, based on a predetermined rule, and by classifying drive history data of a probe car for each route including a route that runs from the passing-through intersection to the target intersection.

20. The computer program according to claim 19, further causing the computer to perform the following functions:
determining that a vehicle driving on the guidance route stops at the passing-through intersection;
specifying a second stoppage ratio basing on the first stoppage ratio in a case where the probe car stops at the passing-through intersection; and
providing information related to a second stoppage ratio when the stoppage determining means determines that the vehicle stops, the second stoppage ratio being associated with the assigned guidance intersection.

* * * * *